United States Patent
Cheng et al.

(10) Patent No.: US 9,971,094 B1
(45) Date of Patent: May 15, 2018

(54) OPTICAL MODULE

(71) Applicant: ELASER TECHNOLOGIES CO., LTD., New Taipei (TW)

(72) Inventors: Chu-Liang Cheng, New Taipei (TW); Chi-Hua Wang, Taipei (TW)

(73) Assignee: ELASER TECHNOLOGIES CO., LTD., New Taipei (TW)

(*) Notice: Subject to any disclaimer, the term of this patent is extended or adjusted under 35 U.S.C. 154(b) by 0 days. days.

(21) Appl. No.: 15/649,604

(22) Filed: Jul. 13, 2017

(30) Foreign Application Priority Data

Jun. 16, 2017 (TW) .............................. 106120262 A

(51) Int. Cl.
*G02B 6/42* (2006.01)
*G02B 6/28* (2006.01)
*G02B 6/293* (2006.01)

(52) U.S. Cl.
CPC ....... *G02B 6/29367* (2013.01); *G02B 6/4214* (2013.01); *G02B 6/4215* (2013.01); *G02B 6/2938* (2013.01)

(58) Field of Classification Search
None
See application file for complete search history.

(56) References Cited

U.S. PATENT DOCUMENTS

| 5,355,249 | A | * | 10/1994 | Souda | G02B 6/2706 359/341.1 |
|---|---|---|---|---|---|
| 6,914,676 | B2 | | 7/2005 | Richard et al. | |
| 7,184,621 | B1 | | 2/2007 | Zhu | |
| 7,945,169 | B2 | * | 5/2011 | Oki | G02B 6/4246 174/254 |
| 9,229,167 | B2 | | 1/2016 | Chang et al. | |
| 2006/0088255 | A1 | * | 4/2006 | Wu | G02B 6/2938 385/92 |
| 2013/0044977 | A1 | * | 2/2013 | Amit | G02B 6/4206 385/33 |

* cited by examiner

*Primary Examiner* — Jerry Rahll
(74) *Attorney, Agent, or Firm* — JCIPRNET

(57) ABSTRACT

An optical module adapted to combine a first and a second light beam into a mixed light beam is provided. The optical module includes a base, an optoelectronic element and an optical dichroic element. The base has an accommodating space. The optoelectronic element is adapted in the accommodating space. The optical dichroic element is adapted on the base. The optical dichroic element includes a transparent element, a first reflector and a second reflector. The transparent element is adapted to let the first light beam and the second light beam pass through. The first and second reflector are disposed on the transparent element. The first reflector is adapted to reflect the first light beam to the second reflector. The second reflector is adapted to reflect the first light beam and let the second light beam pass through. The first and the second reflector are opposite and not parallel to each other on the transparent element, and there is an angle between the first and the second reflector.

14 Claims, 4 Drawing Sheets

OPTICAL MODULE

CROSS-REFERENCE TO RELATED APPLICATION

This application claims the priority benefit of Taiwan application serial no. 106120262, filed on Jun. 16, 2017. The entirety of the above-mentioned patent application is hereby incorporated by reference herein and made a part of this specification.

BACKGROUND OF THE INVENTION

Field of the Invention

The invention is related to an optical module, and particularly to an optical module including an optical dichroic element.

Description of Related Art

With advancements in communication technologies, communication methods are no longer limited by implementation using electrical signals. In recent technological development, optical communication technologies have been developed to realize signal transmission with optical signals. Because transmission speed and distance of light in fiber is far higher and longer than electrons, optical communication technologies have gradually become the mainstream in the market. Therefore, based on high bandwidth requirements, demands for optical transceiver modules capable of transmitting massive amount of optical signal also become higher each day.

However, costs in deployment of optical cables can be fairly expensive. Correspondingly, when optical signals transmittable within one optical cable are to be increased, other than increasing signal frequency, it often requires light rays with various wavelengths to be introduced and combined within the same optical fiber cable in order to significantly increase signal transferring amount. A wavelength division multiplexer (WDM) is one of solutions to achieve such objective. Nonetheless, the existing wavelength division multiplexer involves numerous components, which lead to higher costs and lower yield rate in the manufacturing process due to complexity in terms of configuration. Therefore, how to provide the wavelength division multiplexer designed with simple architecture, lesser space occupied in the device and wider application for multiple devices has long been an issue to be addressed by persons skilled in the art.

SUMMARY OF THE INVENTION

The invention provides an optical module with simple structure and lesser occupied space in a light beam integration system.

An optical module of the invention is adapted to combine a first light beam and a second light beam into a mixed light beam. The optical module includes a base, an optoelectronic element and an optical dichroic element. The base has an accommodating space. The optoelectronic element is disposed in the accommodating space. The optical dichroic element is disposed on the base. The optical dichroic element includes a transparent element, a first reflector and a second reflector. The transparent element is adapted to let the first light beam and the second light beam pass through. The first and the second reflector are disposed on the transparent element. The first reflector is adapted to reflect the first light beam to the second reflector. The second reflector is adapted to reflect the first light beam and let the second light beam pass through. The first and the second reflector are opposite and not parallel to each other on the transparent element, and there is an included angle between the first and the second reflector.

In one embodiment of the invention, wavelengths of the first light beam and the second light beam are all different from one another.

In one embodiment of the invention, a direction along which the first light beam is transmitted into the transparent element is perpendicular to a direction along which the second light beam is transmitted into the transparent element.

In one embodiment of the invention, the transparent element includes one polygon transparent prism.

In one embodiment of the invention, the first reflector and the second reflector are surface coatings of the transparent element.

In one embodiment of the invention, the first reflector and the second reflector are formed by a transparent sheet and surface coatings thereon.

In one embodiment of the invention, the transparent element includes one polygon frame.

In one embodiment of the invention, the optoelectronic element is a light-emitting element adapted to provide a first light beam.

In one embodiment of the invention, the optical module further includes an optical collimator disposed between the light-emitting element and the first reflector.

In one embodiment of the invention, the second reflector is adapted to reflect a preset wavelength light beam, and the wavelength of the preset wavelength light beam is identical to the wavelength of the corresponding first light beam.

In one embodiment of the invention, the included angle is determined according to the refractive index of the transparent element and a preset incident angle of the second reflector.

In one embodiment of the invention, the optical module is also adapted to separate the mixed light beam into the first light beam and the second light beam.

In one embodiment of the invention, the optoelectronic element is a light detector adapted to receive the first light beam.

In summary, according to the embodiments of the invention, the optical module includes the base, the optoelectronic element and the optical dichroic element. The optical dichroic element includes the transparent element, the first reflector and the second reflector. The first reflector is adapted to reflect the first light beam to the second reflector. The first and the second reflector are opposite and not parallel to each other on the transparent element, and there is an included angle between the first and the second reflector. Therefore, the structure of the optical module is simple and occupies less space in other devices.

In order to make the aforementioned features and advantages of the invention more comprehensible, embodiments accompanying figures are described in detail below.

DESCRIPTION OF EMBODIMENTS

Figure 1:
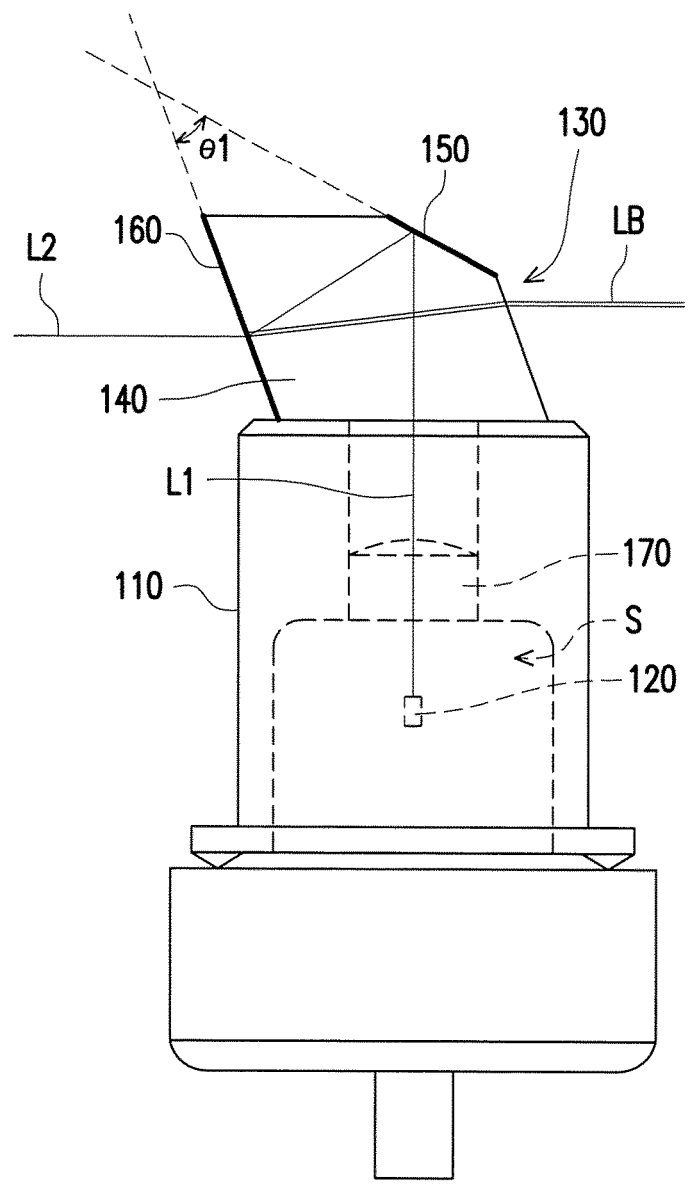
FIG. 1 is a schematic view of an optical module according to one embodiment of the invention.

FIG. 1 is a schematic view of an optical module according to one embodiment of the invention. Referring to FIG. 1, in the embodiment, an optical module 100 is applicable to various devices that need to integrate light beams with different wavelengths into one single light beam, or can be applied to serve as an element using optical signals with one or more wavelengths, such as optical signal devices including the wavelength division multiplexer (WDM), a coarse wavelength division multiplexer (CWDM) or a dense wavelength division multiplexer (DWDM).

In the embodiment, the optical module 100 is adapted to combine a first light beam L1 and a second light beam L2 into a mixed light beam LB. Among them, wavelengths of the first light beam L1 and the second light beam L2 are different. The optical module 100 includes a base 110, an optoelectronic element 120 and an optical dichroic element 130. The base 100 has an accommodating space S, and the optoelectronic element 120 is disposed in the accommodating space S. In the embodiment, the optoelectronic element 120 is a light-emitting element adapted to provide the first light beam L1. The light-emitting element is, for example, a laser generator such as a laser diode, a light-emitting diode (LED) or other suitable light-emitting elements, which should not be construed as a limitation to the invention. In other embodiments, the optoelectronic element 120 may be a light detector; detailed descriptions of embodiment are incorporated in following paragraphs.

The optical dichroic element 130 includes a transparent element 140, a first reflector 150 and a second reflector 160. The transparent element 140 is adapted to let the first light beam L1 and the second light beam L2 pass through, wherein a direction along which the first light beam L1 is transmitted into the transparent element 140 is perpendicular to a direction along which the second light beam L2 is transmitted into the transparent element 140. In the embodiment, the transparent element 140 is formed by one polygon transparent prism, such as a pentagonal prism, which is made of, for example, a material of glass or plastic. However, the prism type and the material of the transparent element 140 are not particularly limited by the invention.

In the embodiment, a first reflector 150 and a second reflector 160 are disposed on the transparent element 140, wherein the first reflector 150 and the second reflector 160 are opposite and not parallel to each other on the transparent element 140, and there is an included angle θ1 between the first reflector 150 and the second reflector 160. In other words, the first reflector 150 and the second reflector 160 are disposed on two different surfaces of the transparent element 140, and an included angle θ1 is formed between an extending direction of the first reflector 150 and an extending direction of the second reflector 160. In the embodiment, the range of the included angle θ1 is determined according to the material of the transparent element 140 and a preset incident angle of the second reflector 160. As a result, the size of optical dichroic element 130 can be reduced so that the optical module 100 can have a simple structure with less occupied space in other devices.

In the embodiment, the first reflector 150 and the second reflector 160 are surface coatings of the transparent element 160. Among them, the first reflector 150 is coated with, for example, a mirror coating, and is thus able to reflect light beams with any wavelength. Accordingly, the manufacturing cost of the optical module 100 can be reduced. The second reflector 160 is coated with a selective reflection coating for reflecting light beams with one single wavelength. In other words, the second reflector 160 reflects the light beam with a preset single wavelength and allows transmission for the light beams with other wavelengths; the wavelength of the light beam restricted by the second reflector 160 from passing through is identical to the wavelength of the transmitted first light beam L1. Accordingly, users can easily change the element in the devices for the required light beam with the preset wavelength in any devices using the optical module 100 of the present embodiment simply by replacing the optical dichroic element 130.

In the embodiment, the first reflector 150 is adapted to reflect the first light beam L1 to the second reflector 160. The second reflector 160 is adapted to reflect the first light beam L1 and let the second light beam L2 pass through. Specifically, as a transmission path of the first light beam L1 in sequence, the first light beam L1 is first transmitted from the underneath of the optical dichroic element 130 to the transparent element 140. Next, the first light beam L1 in the transparent element 140 is transmitted to the first reflector 150, where the first reflection occurs. Next, the first light beam L1 is reflected by the first reflector 150 to the second reflector 160, where the second reflection occurs. Then, the first light beam L1 is reflected by the second reflector 160 to the transparent element 140 and transmitted outside from a surface not having the first reflector 150. As a transmission path of the second light beam L2 in sequence, the second light beam L2 is transmitted from the outside and then passes through the second reflector 160 on the transparent element 140. An entering point of the second light beam L2 on the second reflector 160 is identical to an entering point of the first light beam L1 transmitted from the transparent element 140 on the second reflector 160. Next, the first light beam L1 and the second light beam L2 are combined into the mixed light beam LB, transmitted by the second reflector 160 to pass through the transparent element 140, and transmitted outside from a surface not having the first reflector 150 at last. In other words, the included angle θ1 between the first reflector 150 and the second reflector 160 can be properly designed so the second light beam L2 can be superposed with first light beam L1 and combined into the mixed light beam LB after passing through the second reflector 160.

In the embodiment, the optical module 100 further includes an optical collimator 170 disposed between the optoelectronic element 120 and the first reflector 150. Specifically, the optical collimator 170 is disposed on the transmission path of the first light beam L1 and adapted to collimate the first light beam L1 transmitted by the optoelectronic element 120 for entering the optical dichroic element 130. In this way, power and collimation of the first light beam L1 can be improved.

Figure 2:
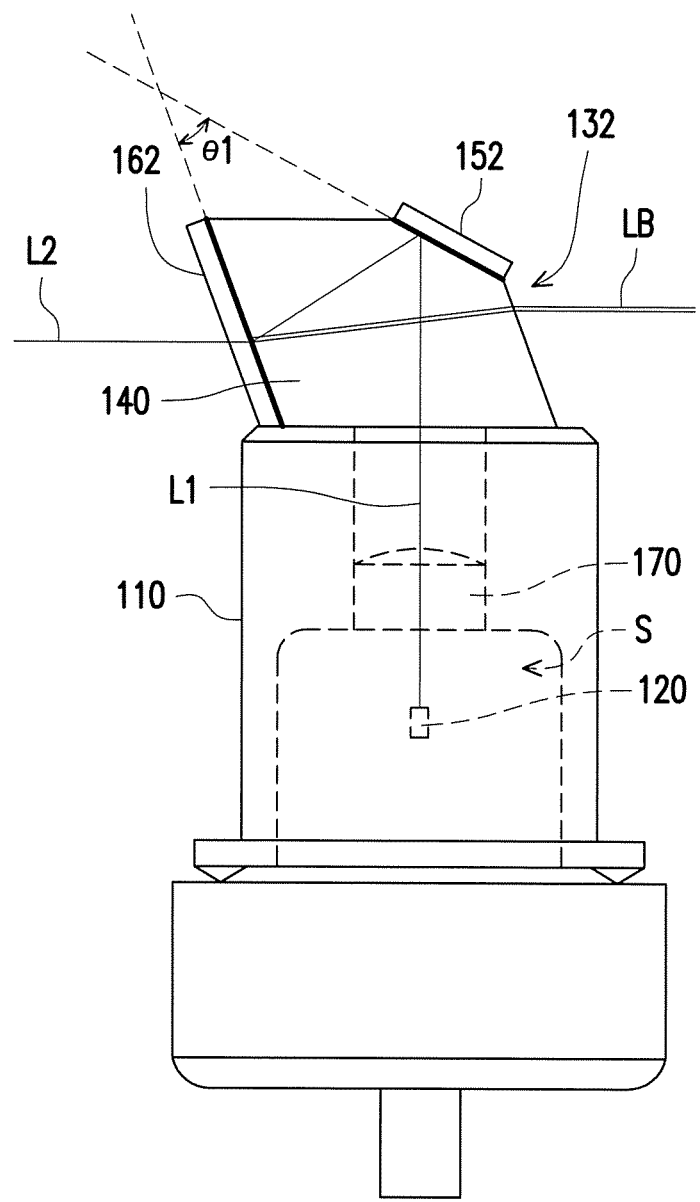
FIG. 2 is a schematic view of an optical module according to another embodiment of the invention.

FIG. 2 is a schematic view of an optical module according to one embodiment of the invention. Referring to FIG. 2, an optical module 102 of the embodiment is similar to the optical module 100 of FIG. 1; the only difference between them is that a first reflector 152 and a second reflector 162 of an optical dichroic element 132 are formed by a transparent sheet and surface coatings thereon. A material of the transparent material sheet may be identical to or different from the material of the transparent element 140, which is not particularly limited by the invention. Specifically, in the embodiment, the first reflector 152 and the second reflector 162 are formed by a coating deposition on a transparent material and then the optical dichroic element 132 is formed by bonding said reflectors onto the transparent element 140. In other words, in the present embodiment, the desired first reflector 152 and the second reflector 162 can be fabricated in advance and assembled onto the transparent element 140 later to form the optical dichroic element 132. By doing so, the transparent element 140 used can be less, and the transparent sheet can be replaced according to the wavelength of the transmitted second light beam L2 so as to improve the convenience for replacing the elements.

Figure 3:
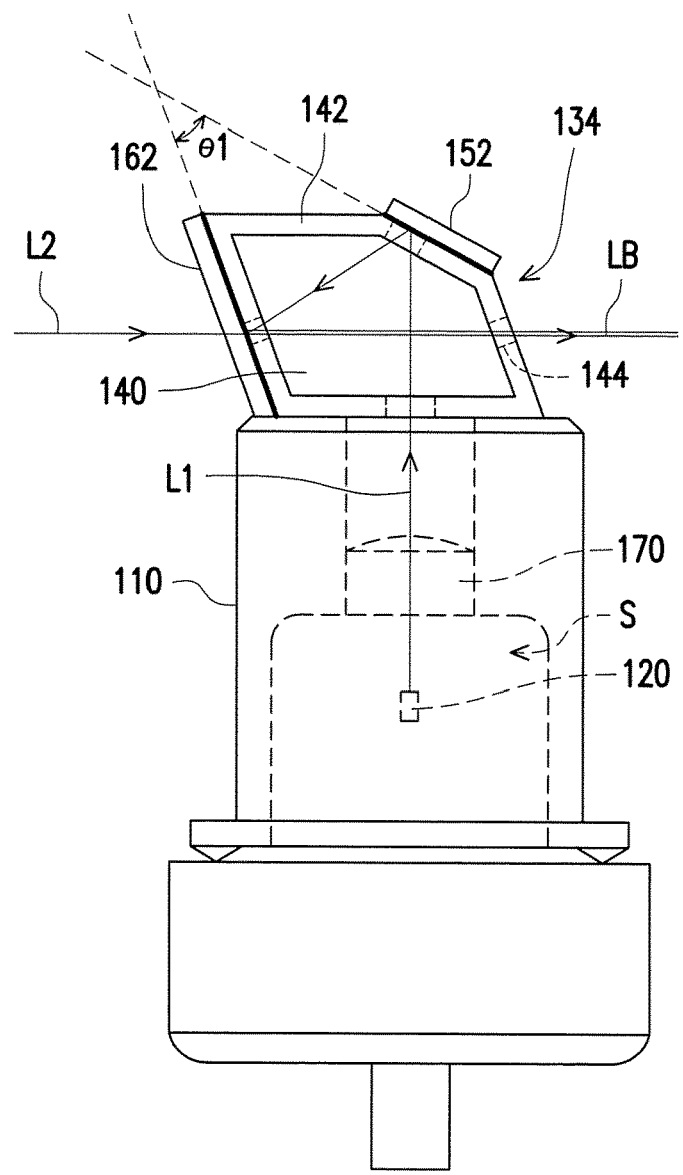
FIG. 3 is a schematic view of an optical module according to yet another embodiment of the invention.

FIG. 3 is a schematic view of an optical module according to yet another embodiment of the invention. Referring to FIG. 3, an optical module 104 of the embodiment is similar to the optical module 102 of FIG. 2; the only difference between them is that the transparent element 140 of an optical dichroic element 134 includes a polygon frame 142, which is, for example, a polygon frame 142 of hollow-type having a light-transmission hole 144. With such configuration, the first reflector 152 and the second reflector 162 can be disposed on the polygon frame 142 without configuring an additional polygon transparent prism. In other words, the transparent element 140 can also be directly formed by the polygon frame 142 of hollow-type having the light-transmission hole 144 so the making of the optical dichroic element 134 can then be completed by disposing the first reflector 152 and the second reflector 162 on the light-transmission hole 144 of the polygon frame 142.

It should be indicated that, in using the optical module of the invention, a plurality of the optical modules may be used and disposed on a single assembly such as a circuit board depending on the needs for combining light beams with a plurality of different wavelengths. The aforementioned optical modules may be one or a combination of the optical modules described in the aforementioned embodiments, which is not particularly limited by the invention. The number of the optical module may be changed depending on the requirement of other devices, which is not particularly limited by the invention. Sufficient teaching, suggestion, and implementation illustration regarding detailed transmission paths of the light beams with a plurality of different wavelengths in the mixed light beam within the respective optical modules can be obtained with reference to the foregoing embodiments, which are not repeated hereinafter.

Figure 4:
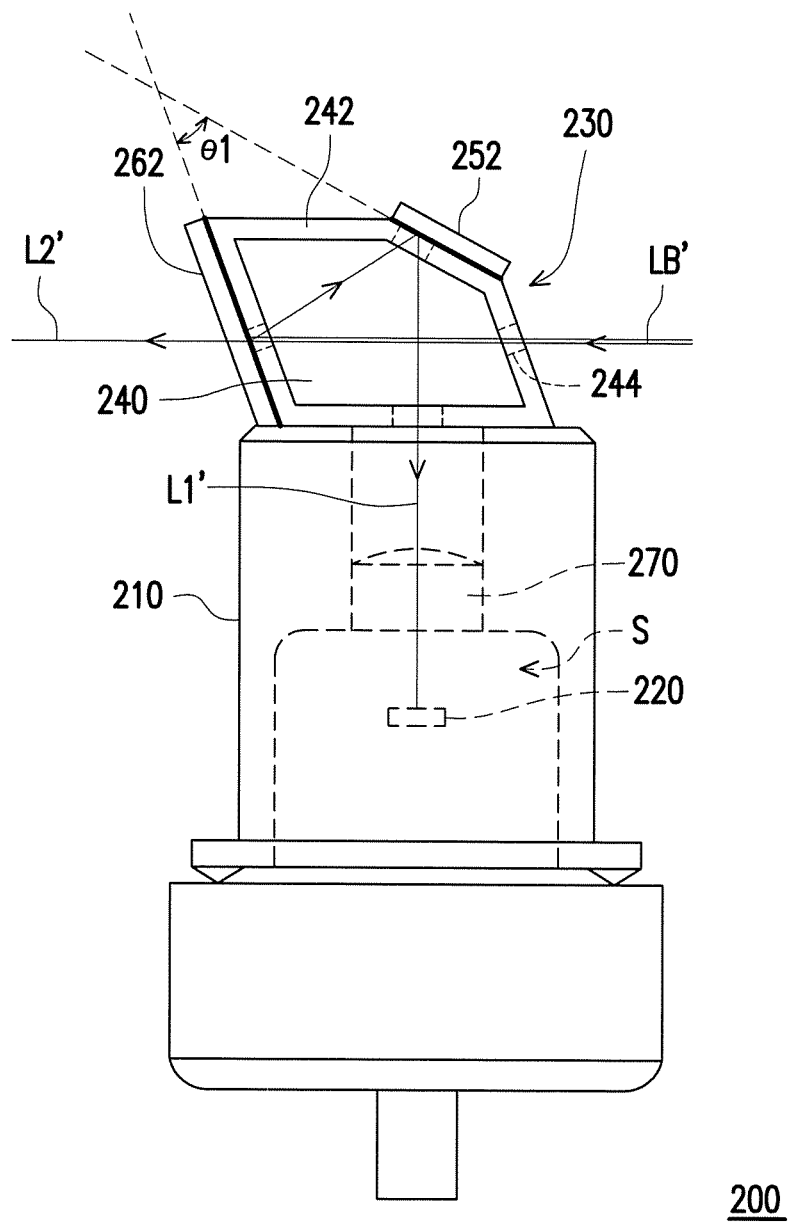
FIG. 4 is a schematic view of an optical module according to still another embodiment of the invention.

FIG. 4 is a schematic view of an optical module according to still another embodiment of the invention. Referring to FIG. 4, in the embodiment, an optical module 200 is similar to the optical module 104 of FIG. 3; the only difference between them is that the optical module 200 is adapted to separate a mixed light beam LB' into a first light beam L1' and a second light beam L2'. Specifically, an optical dichroic element 230 of the optical module 200 can also be applied to serve as an optical beam-splitting element. First of all, the mixed light beam LB' is provided and transmitted from the outside into the optical dichroic element 230. Here, the mixed light beam LB' is formed by combining the first light beam L1' and the second light beam L2' described above. Afterwards, a second reflector 262 is disposed on a polygon frame 242, wherein the wavelength of the light beam restricted from passing through by the second reflector 262 is the wavelength of the first light beam L1' in the mixed light beam LB'. Therefore, when the mixed light beam LB' is transmitted to the second reflector 262 via a transparent element 240, the first light beam L1' in the mixed light beam LB' is reflected by the second reflector 262 and then transmitted to pass through the accommodating space S to the outside for measurement or analysis. On the other hand, the second light beam L2' in the mixed light beam LB' passes through the second reflector 262 to complete separating the light beams. Therefore, the optical module of the invention may be used for combining or splitting light beams depending on the user's need, and the invention provides no limitation thereto.

In the embodiment, the optical module 200 includes an optoelectronic element 220 and an optical condensing element 270. The optoelectronic element 220 is a light detector, such as a photodetector, adapted to receive the first light beam L1'. Accordingly, the first light beam L1' in the mixed light beam LB' is reflected by the second reflector 262 and then transmitted to the optoelectronic element 220 disposed in the accommodating space S for measurement or analysis. The optical condensing element 270 is disposed between the optoelectronic element 220 and the first reflector 252. Specifically, the optical condensing element 270 is disposed on the transmission path of the first light beam L1' and adapted to condense the first light beam L1' reflected by the second reflector 262 to be transmitted into the optoelectronic element 220. As a result, the coupling efficiency of the optoelectronic element 220 with respect to the first light beam L1' can be improved.

It should be indicated that, in using the optical module of the invention, a plurality of the optical modules may be used and disposed on a single assembly such as a circuit board depending on the needs for separating light beams with a plurality of different wavelengths. The aforementioned optical modules may be one or a combination of the optical modules described in the aforementioned embodiments, which is not particularly limited by the invention. The number of the optical module may be changed depending on the requirement of other devices, which is not particularly limited by the invention. Sufficient teaching, suggestion, and implementation illustration regarding detailed transmission paths of the light beams with a plurality of different wavelengths in the mixed light beam within the respective optical modules can be obtained with reference to the foregoing embodiments, which are not repeated hereinafter.

In summary, according to the embodiments of the invention, the optical module includes the base, the optoelectronic element and the optical dichroic element. The optical dichroic element includes the transparent element, the first reflector and the second reflector. The first reflector is adapted to reflect the first light beam to the second reflector. The first and the second reflector are opposite and not parallel to each other on the transparent element, and there is an included angle between the first and the second reflector. Therefore, the structure of the optical module is simple and occupies less space in other devices.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:
1. An optical module, adapted to combine a first light beam and a second light beam into a mixed light beam, and comprising:
  a base, comprising an accommodating space;
  an optoelectronic element, disposed in the accommodating space; and
  an optical dichroic element, disposed on the base, and comprising:

a transparent element, adapted to let the first light beam and the second light beam pass through;

a first reflector, disposed on the transparent element; and a second reflector, disposed on the transparent element, the first reflector adapted to reflect the first light beam to the second reflector, the second reflector adapted to reflect the first light beam and let the second light beam pass through, wherein the first reflector and the second reflector are opposite and not parallel to each other on the transparent element, and an included angle is provided between the first reflector and the second reflector.

2. The optical module according to claim 1, wherein wavelengths of the first light beam and the second light beam are different.

3. The optical module according to claim 1, wherein a direction along which the first light beam is transmitted into the transparent element is perpendicular to a direction along which the second light beam is transmitted into the transparent element.

4. The optical module according to claim 1, wherein the transparent element comprises a polygon transparent prism.

5. The optical module according to claim 4, wherein the first reflector and the second reflector are surface coatings on the transparent element.

6. The optical module according to claim 1, wherein the first reflector and the second reflector are formed by a transparent sheet and surface coatings thereon.

7. The optical module according to claim 6, wherein the transparent element comprises a polygon frame.

8. The optical module according to claim 1, wherein the optoelectronic element is a light-emitting element adapted to provide the first light beam.

9. The optical module according to claim 8, further comprising an optical collimator disposed between the light-emitting element and the first reflector.

10. The optical module according to claim 1, wherein the second reflector is adapted to reflect a preset wavelength light beam, and a wavelength of the preset wavelength light beam is identical to a wavelength of the corresponding first light beam.

11. The optical module according to claim 1, wherein the included angle is determined according to a refractive index of the transparent element and a preset incident angle of the second reflector.

12. The optical module according to claim 1, wherein the optical module is also adapted to separate the mixed light beam into the first light beam and the second light beam.

13. The optical module according to claim 12, wherein the optoelectronic element is a light detector adapted to receive the first light beam.

14. The optical module according to claim 13, further comprising an optical condensing element disposed between the light detector and the first reflector.

* * * * *